Sept. 18, 1928.
E. NIBBS
1,684,407
INTERNAL COMBUSTION ENGINE
Filed Nov. 1, 1926     5 Sheets-Sheet 1
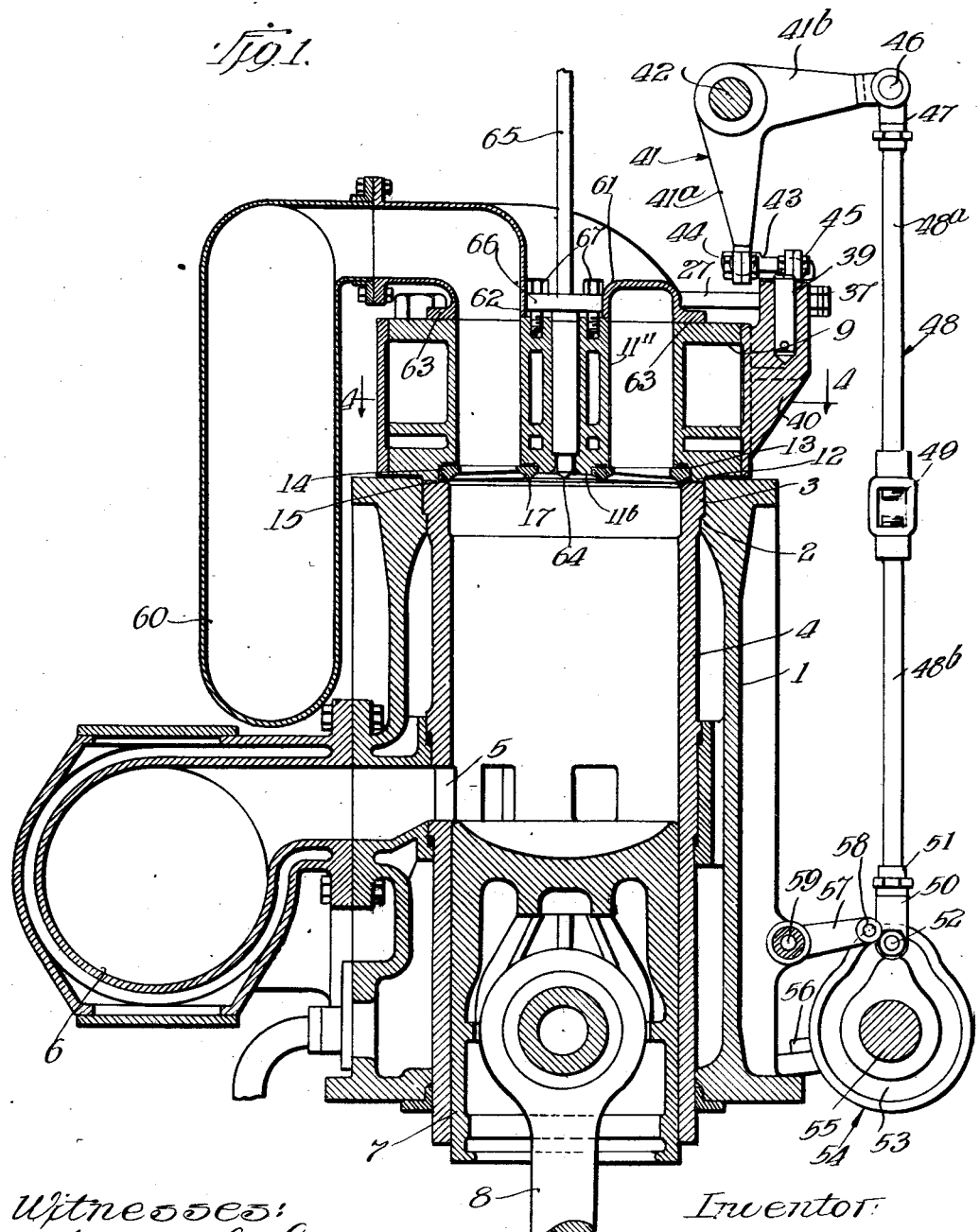

Sept. 18, 1928.  1,684,407
E. NIBBS
INTERNAL COMBUSTION ENGINE
Filed Nov. 1, 1926  5 Sheets-Sheet 2
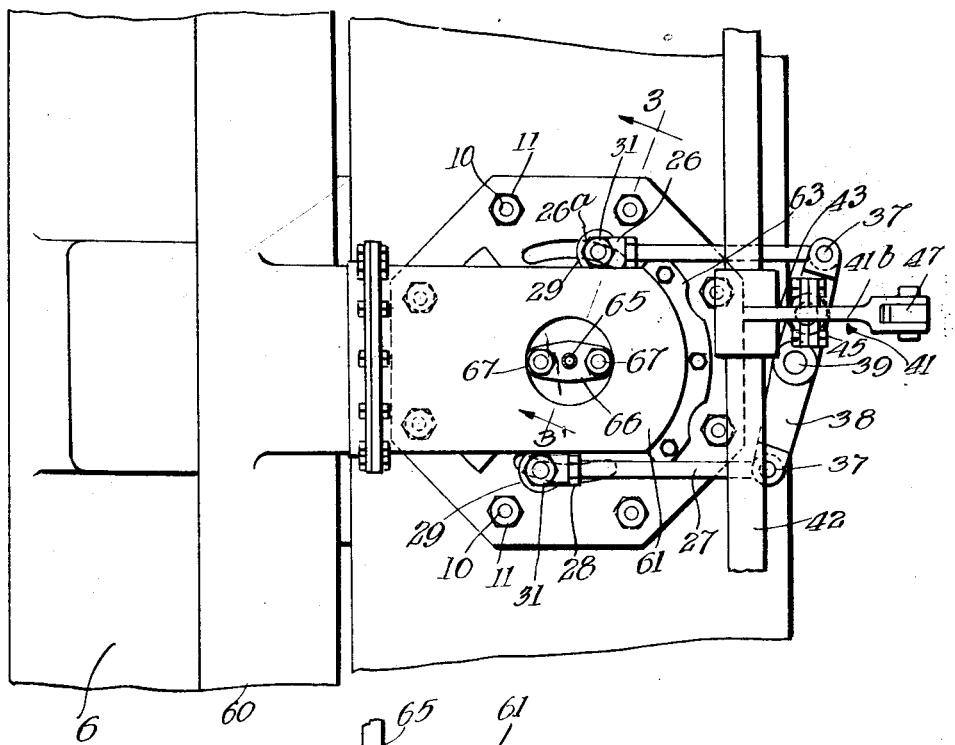
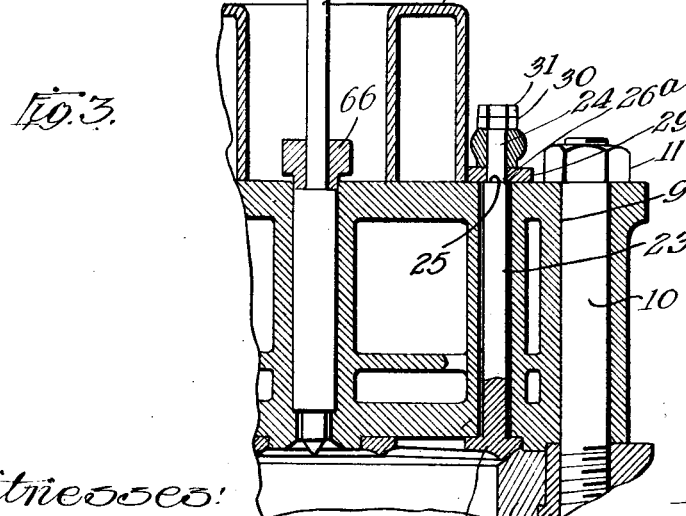
Witnesses:  Inventor
Harry E. L. White.  Ernest Nibbs.
William P. Kilroy  By Brown, Boettcher & Dienner
Attys.

Sept. 18, 1928.
E. NIBBS
1,684,407
INTERNAL COMBUSTION ENGINE
Filed Nov. 1, 1926   5 Sheets-Sheet 3
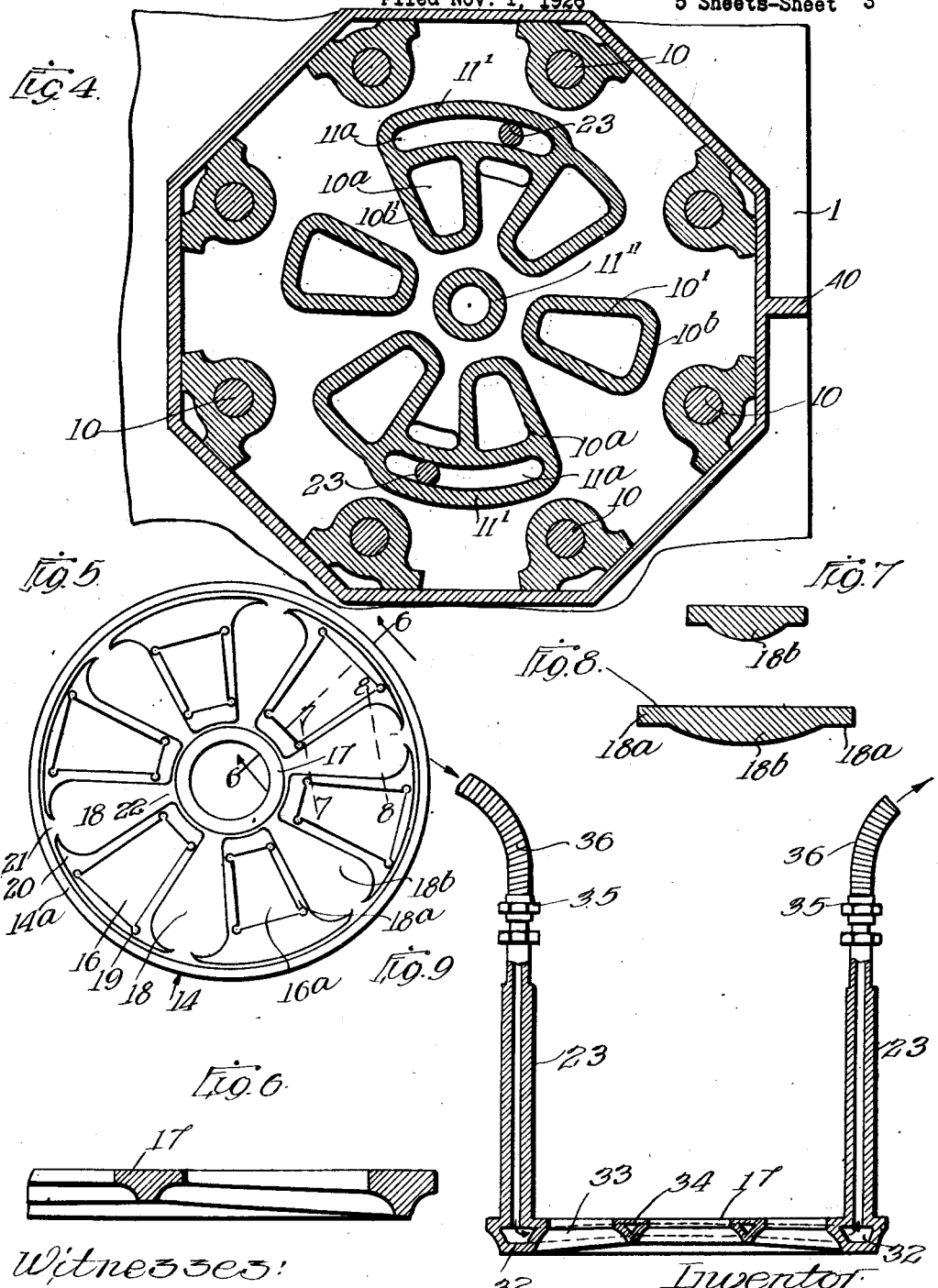

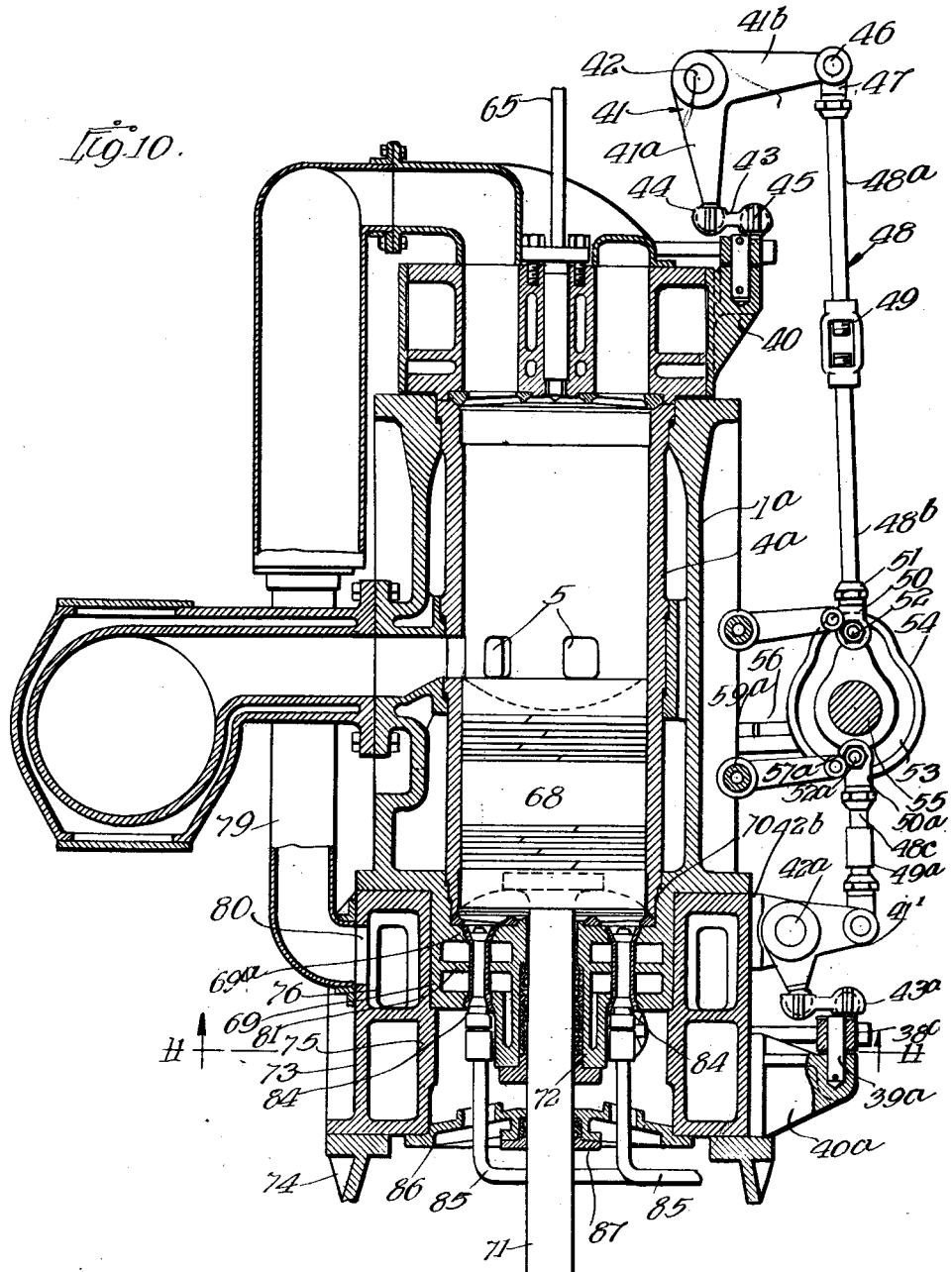

Sept. 18, 1928.  
E. NIBBS  
1,684,407  
INTERNAL COMBUSTION ENGINE  
Filed Nov. 1, 1926  5 Sheets-Sheet 5

Witnesses  
Harry E. L. White  
William P. Kilroy

Inventor  
Ernest Nibbs  
By Brown, Boettcher & Dienner  
Attys

Patented Sept. 18, 1928.

1,684,407

UNITED STATES PATENT OFFICE.

ERNEST NIBBS, OF NEW LONDON, CONNECTICUT, ASSIGNOR TO ELECTRIC BOAT COMPANY, OF GROTON, CONNECTICUT, A CORPORATION OF NEW JERSEY.

INTERNAL-COMBUSTION ENGINE.

Application filed November 1, 1926. Serial No 145,386.

This invention relates to internal combustion engines, and more particularly to a scavenging arrangement for a two-cycle engine of the Diesel type.

Two-cycle internal combustion engines require scavenging with pure air at the close of each working stroke, and the scavenging has to be completed leaving the cylinder charged with pure air prior to the subsequent or compression stroke. Engines have been developed in which valves are mounted in the cylinder head radially, or substantially radially thereof, these valves serving to admit air for scavenging purposes. Considerable trouble has been experienced in engines of this type owing to the difficulty of obtaining a material that will withstand heat stresses and at the same time will provide sufficient area for the scavenging air to pass through without excessive loss of pressure. Due to these difficulties, port scavenging has been largely developed and is employed in many internal combustion engines. While the port scavenging largely obviates the difficulties encountered when the valves are mounted in the cylinder head, it has not proved to be thoroughly satisfactory. In the port scavenging type of engine, the air has to travel from the bottom of the cylinder to the top and down again to the bottom which results in considerable difficulty caused by interferring stream lines rendering it very difficult to obtain complete and satisfactory scavenging of the cylinder within the short time permitted for this purpose. In the type of engine employing the scavenging valves in the head, the air travels through the cylinder from the top to the bottom thereof so that the cylinder could be scavenged much more quickly than with the port scavenging type except for the difficulty above noted of obtaining a valve of sufficient size to admit the proper quantity of air to the cylinder and yet capable of withstanding the heat stresses to which such a valve is necessarily subjected.

My invention combines the best features of the two above noted methods of scavenging now in general use while avoiding the objections of such methods. I provide means whereby air is admitted at the head end of the cylinder at the end of the working or expansion stroke and passes through the cylinder axially thereof to the outlet port. This insures thorough scavenging of the cylinder in a minimum period of time and also has the advantage that a large volume of air is admitted to the cylinder insuring a complete charge of pure air in the cylinder at the commencement of the compression stroke, which insures complete combustion of the oil or other fuel injected into the cylinder. The means for admitting the air to the cylinder is driven in synchronism with the engine and can be so adjusted as to be closed at any desired time after the piston covers the exhaust ports thus rendering it possible to supercharge the cylinder to any desired extent and within a wide range, which I consider a very important feature of my invention. While my invention is intended more particularly for use in connection with a two-cycle engine of the Diesel type, it may be used to advantage in connection with explosive engines either of the 4-cycle or Otto-cycle type, as well as with explosive engines of the two-cycle type. My invention may also be used to advantage in connection with the Diesel type of engine employing the true Diesel cycle. It will be understood, therefore, that I do not intend to limit my invention to the 2-cycle type of Diesel engine though it is particularly adapted for this type of engine.

One of the main objects of my invention is to provide simple and efficient means of the character above stated, by means of which a 2-cycle Diesel type of engine can be thoroughly scavenged and provided with a charge of pure air in the short length of time permitted for this purpose. A further object is to provide means of this character which permits of the engine being supercharged within wide limits. Another object is to provide a valve for controlling the admission of the scavenging air, this valve being so constructed as to insure proper seating of the same by the pressure developed within the cylinder during the combustion stroke. Further objects will appear from the detail description.

In the drawings:—

Fig. 1 is a central vertical section through a cylinder and asssociated parts of an engine constructed in accordance with my invention, parts being shown in elevation and the engine illustrated being of the 2-cycle Diesel type;

Fig. 2 is a plan view;

Fig. 3 is a fragmentary vertical section taken substantially on line 3—3 of Fig. 2;

Fig. 4 is a section taken on line 4—4 of Fig. 1;

Fig. 5 is an underneath view of the valve;

Fig. 6 is a section taken substantially on line 6—6 of Fig. 5;

Fig. 7 is a section taken substantially on line 7—7 of Fig. 5;

Fig. 8 is a section taken substantially on line 8—8 of Fig. 5;

Fig. 9 is a central vertical sectional view of a water-cooled type of valve;

Fig. 10 is a central vertical section through a cylinder and associated parts of a double acting engine constructed in accordance with my invention, parts being shown in elevation;

Figure 11:
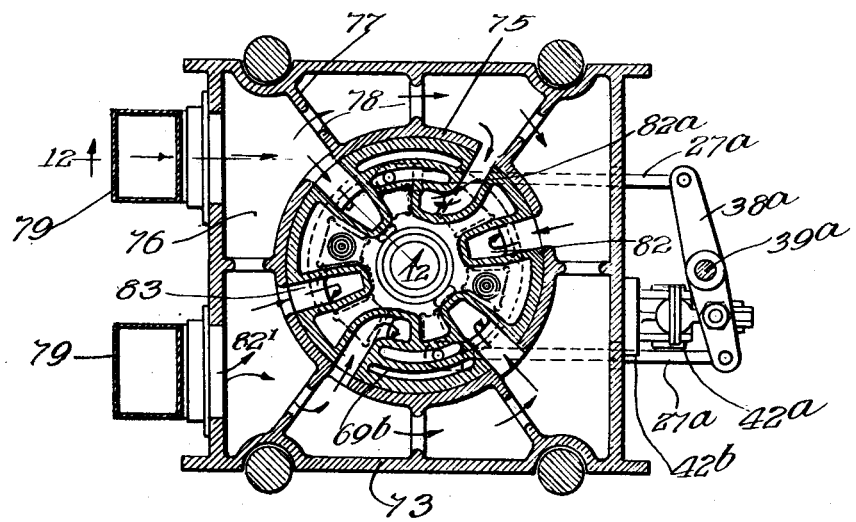
Fig. 11 is a section taken substantially on line 11—11 of Fig. 10.

The engine crank case, cylinder block, brackets for supporting the cam shaft, and associated parts are of well known construction and need not be illustrated or described in detail as construction of these parts may be varied within wide limits to suit the particular conditions under which the engine is to be used. Cylinder block 1 is of known construction and is secured in a known manner to the crank case (not shown) of the engine. This block is provided at its upper end with an inner annular shoulder 2, upon which seats an outer annular shoulder 3 of a liner 4. This liner is provided with outlet openings or exhaust ports 5 which communicate in a known manner with an exhaust header or manifold 6 of known construction. The exhaust ports 5 are so positioned as to be uncovered by the piston 7 operating in cylinder liner 4 as the piston approaches the end of its working or out stroke. This piston is of known construction and has a connecting rod 8 connected thereto in a known manner, this rod serving to establish operating connections between the pistons and the crank shaft of the engine, which is not shown. The construction illustrated and so far described may be considered as the known or standard construction commonly employed in 2-cycle engines of the Diesel type. In this type of engine, the exhaust ports 5 are covered by the piston 7 shortly before the commencement of its compression or in stroke and remain covered during the remainder of such stroke and for the greater portion of the combustion or out stroke of the piston, these ports being uncovered by the piston as it approaches the end of its out stroke. As the exhaust ports are uncovered, the products of combustion flow from the cylinder thru such ports and air is admitted to the cylinder for scavenging purposes, the pure air thus admitted to the cylinder being compressed during the in stroke of the piston to the proper degree of pressure, at which time the fuel oil mixture is sprayed into the cylinder, the resulting combustion and expansion of the fuel oil and the air being employed for forcing the piston 7 outwardly of the cylinder during the working stroke, as is well known in this art. The outer or upper end of the cylinder is closed by a head 9 secured to the cylinder block by screw studs 10 and nuts 11 threaded thereon, in a known manner. This head is provided with a plurality of segmental openings extending through the head from the outer to the inner face thereof, these openings being disposed radially of the head and concentric with a spray nozzle receiving tube 11" at the center of the head. Certain of these openings, designated 10$^A$, are of less length than the remaining openings 10' to accommodate arcuate guide elements 11' formed in the head and defining guide slots 11$^A$ also extending from the inner face of the head to the outer face thereof. It will be noted that the elements or walls 11' defining the guide slots 11$^A$, and the elements 10$^B$ and 10$^{B'}$ defining the openings 10' and 10$^A$ respectively, are of very appreciable length. These elements serve to reinforce the head in such manner that it is well able to withstand the pressure to which it is necessarily subjected in the operation of the engine. The head being of hollow construction, as illustrated, is cooled by water circulating therethrough in a known manner, the cylinder being also cooled in the same manner.

It will be noted that the openings 10' and 10$^A$ are disposed in the direction of the axis of the head and therefore in the direction of the axis of the cylinder. I consider this feature of my invention of importance as it insures that the air entering the cylinder goes into the cylinder in the direction of the axis thereof thus avoiding interferring stream lines and insuring thorough scavenging of the cylinder within the short time allowed for this purpose. Another important feature of my invention is the segmental shape of the openings 10' and 10$^A$ and the arrangement of these openings radially of the head in concentric spaced relation to the spray nozzle tube 11" and with their base or broader portions disposed outwardly toward the periphery of the head. This insures that the volume of air flowing into the cylinder will increase uniformly outwardly of the cylinder radially thereof. As the inner end portions of the openings 10' and 10$^A$ are disposed closely adjacent each other, a sufficient volume of air will enter these portions of the openings to insure ample provision of air at the central portion of the cylinder. This particular type and arrangement of the scavenging air openings thus insures thorough scavenging of the cylinder throughout the entire cross area thereof and insures a charge of ample volume of pure air during the compression stroke. This has the advantage of obtaining thorough scavenging of the cylinder and insuring complete combustion with a corresponding increase in efficiency.

Head 9 is provided on its under face with a depending annular flange 12 bearing upon the upper end of the cylinder liner 4 and defining a cylindrical recess 13 receiving a valve 14, this valve being confined between an annular flange 15 at the upper end of the cylinder liner 4 and the under face of the head, the flange 15 being relatively narrow and fitting snugly into the lower portion of recess 13. The upper surface of flange 15 is comparatively narrow and is preferably machined smooth and at a slight inclination providing a small area of contact between the valve and the flange so as to reduce friction between the same and insure ease of operation of the valve.

The valve 14 is of disc shape and is provided with a plurality of segmental openings 16 and 16$^A$ (Fig. 5) disposed to be moved into and out of register with the openings 10' and 10$^A$ respectively of the head. This valve is provided with a central collar 17 which fits about a reduced stud portion 11$^B$ at the lower or inner end of the spray nozzle tube 11''. This collar and the rim 14$^A$ of the valve are connected by segmental elements 18 having narrow flat lateral elements 18$^A$ and a central reinforcing rim 18$^B$. Each of the lateral elements 18$^A$ is cut at each corner of the valve opening at 19 and is further provided at each side of its outer end with a depression 20 of substantially elongated V shape extending from the lateral elements 18. This produces a narrow neck 21 at the outer end of each of the elements 18 which connects this element to the rim 14$^A$, the material of the elements 18 at each side of neck 21 being relatively thin. The element 18 is also connected at its inner end to the collar 17 by a relatively narrow neck 22. In this manner, elements 18 are flexibly connected to the body of the valve at their inner and outer ends so that these elements can give relative to the valve body under the pressure generated in the cylinder during operation of the engine so as to insure tight seating of elements 18 against the under face of the cylinder head. These elements are of sufficient area to completely cover and tightly close the cylinder head openings when the valve is turned into closed position. It will also be noted that the valve openings are shaped and disposed similarly to the openings of the head, and the valve openings cooperate with the head openings to insure uniform distribution of the air throughout the cross area of the cylinder in the manner previously stated. The valve is provided with two posts 23 extending from the upper face of rim 14, these posts being arranged at diametrically opposite points on the valve and operating in the guide slots 11$^A$. The upper portion of each post 23 is reduced and threaded to form a stud 24 and a shoulder 25 which is flush with the upper face of head 9. Stud 24 passes through eye element 26$^A$ of a connecting sleeve 26 into which is threaded one end of Pitman rod 27, a nut 28 being threaded onto the rod and bearing against the end of the sleeve. A collar 29 is mounted about stud 24 and is confined between eye member 26$^A$ and shoulder 25. A nut 30 threaded on the stud 24 above eye member 26$^A$ prevents withdrawal of the stud through the eye member, and a jam nut 31 serves to secure nut 30 against threading off of the stud. The collars 29 serve to support the weight of valve 14 to such an extent that there is no appreciable friction between this valve and the upper end of the cylinder liner, and the distance between the shoulders 25 of the arms 23 and the valve is such as to provide proper clearance between the upper face of the valve and the under face of the cylinder head 9, this clearance being sufficient to eliminate possibility of binding between the valve and the cylinder head due to expansion of parts caused by the high temperature generated in the cylinder. This insures ease and accuracy in operation of the valve and during the compression and combustion strokes, the valve is held seated tightly against the under face of the cylinder head by the pressure generated within the piston in the manner previously described. The valve is preferably made of steel having a high chromium content so as to be heat resistant.

In Fig. 9, I have illustrated a modified form of valve, the rim and the segmental portions of which are bored out to provide passages 32 and 33 which communicate with a passage 34 formed in the collar 17. The arms 23 are also bored out and are adapted for connection at their upper ends, by means of suitable couplings 35 to flexible conduits 36 by means of which water is supplied to the valve and flows therethrough for cooling the valve, as indicated. In all other respects, the construction and operation of the valve illustrated in Fig. 9 is similar to the valve illustrated in Fig. 5.

Pitman rods 27 are pivotally secured at their outer ends at 37 to the ends of a rocker arm 38 which is pivotally mounted for movement about a vertical axis at its central portion on a stud 39 extending from and secured in a bracket 40 carried by the cylinder head 9. A bell crank 41 is rockably mounted above the cylinder head on a supporting rod 42 supported by suitable brackets secured to the engine structure (not shown). A link 43 has its inner end connected to the lower end of the inner arm 41ᴬ of the bell crank by ball and socket connections 44. The outer end of this link is connected by ball and socket connection 45 to the rocker arm 38 to one side of the stud 39. The other arm 41ᴮ of the bell crank is pivotally connected at its outer end, at 46, by means of a connecting sleeve 47 and associated parts to the upper end of a push rod 48 which is formed of two sections 48ᴬ and 48ᴮ connected by a turn buckle 49 by means of which the effective length of the rod can be varied. A connecting sleeve 50 is threaded onto the lower end of the push rod and is locked in position by a jam nut 51 in the same manner as sleeve 47 is connected to the upper end of the rod. Sleeve 50 carries a cam pin 52 which engages in the channel 53 of a box cam 54 secured on a cam shaft 55 rotatably supported in brackets 56 secured to the engine structure. The shaft 55 is driven from the engine and in synchronism therewith in a known manner. A rock arm 57 is pivotally connected at its outer end at 58 to sleeve 50. The inner end of this arm is pivotally mounted at 59 on the cylinder blocks. This arm serves the usual function of guiding the push rod 48 during operation thereof. During operation of the engine, the push rod 48 is reciprocated and by means of the bell crank 41 and associated parts serves to oscillate the valve.

Under normal conditions, the parts are so adjusted that when the exhaust ports have been uncovered by the piston and the pressure within the cylinder falls to that of the exhaust header, the valve is turned into its full open position simultaneously opening all of the scavenging air inlet openings thus permitting thorough scavenging of the cylinder in minimum time and with minimum pressure loss. After the cylinder has been thoroughly scavenged and a charge of pure air is in the cylinder, the valve is turned into position to cover or close the air inlet openings. Normally these openings are closed as soon as the piston has covered the exhaust ports 5 on its inward travel. It is not essential, however, that the scavenging air inlet openings be closed at this time and, in fact, under certain conditions it is desirable that these openings be closed at a latter period. By adjusting the effective length of push rod 48 through the medium of turn buckle 49, it is possible to adjust within wide limits the extent to which the scavenging air openings are uncovered, as well as the time of covering or closing such openings. This renders it possible to close the air inlet openings at any desired period during the inward stroke of the piston 7 after the ports 5 have been covered by the piston. It is therefore possible, by suitably adjusting the effective length of the push rod 48, to supercharge the cylinder to any desired extent within a wide range. I consider this a very important part or feature of my invention, as it frequently becomes necessary to supercharge engines of this type, and my invention provides simple and very efficient means whereby this supercharging can be readily effected and can be adjusted to suit working conditions.

For supplying the scavenging air to the air inlet openings of the engine head, I provide a header 60 with which communicates an annular air chamber or duct 61 having a central depending flange 62 seating upon the upper end of the spray nozzle tube 11″. The air chamber or duct 61 fits over the upper end of the air openings 10′ and 10ᴬ and is provided at its lower end with flanges 62 and 63 seating upon the cylinder head 9 and secured thereto in any suitable manner as by means of cap screws. The air flows from the header 60 into the air chamber or duct 61 and thence into the cylinder through the cylinder head and the valve, when the valve is in open position in the manner previously described. The fuel oil is sprayed into the cylinder by means of a spray nozzle 64 of known construction mounted in the tube 11″ and having connected thereto a tube 65 by means of which fuel oil and, if desired, air, is supplied to the nozzle under proper pressure. The nozzle 64 is secured in position by a follower 66 secured to the upper end of the nozzle receiving tube 11″ by cap screws 67. As the manner of supplying the fuel to the cylinder is well known in this art, it is not thought necessary to further describe or illustrate the same.

Figure 12:
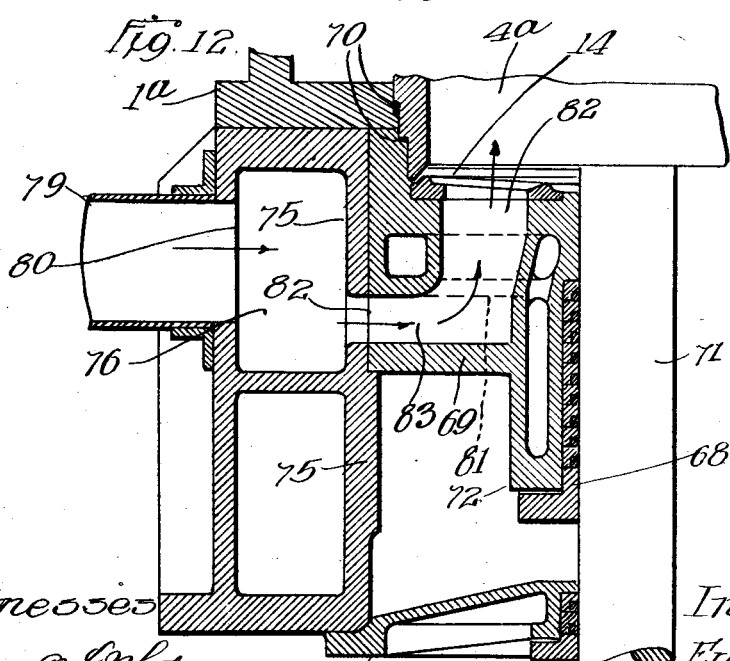
Fig. 12 is a section taken substantially on line 12—12 of Fig. 11.

In Figs. 10 to 12, inclusive, of the drawings, I have illustrated my invention as applied to a double acting engine of the 2-cycle Diesel type. In this type of engine, when the piston 68 is in its extreme position in either direction, the exhaust ports 5 are uncovered. The cylinder block 1ᴬ is provided at its lower end with a head 69 which may be formed integrally with the cylinder block. This head is provided in its bore, which forms a continuation of the bore of the cylinder block, with stepped shoulders 70 which cooperate with similar shoulders on the liner 4ᴬ for holding the liner in position within the head 69. As will be understood, the liner is confined between the heads 9 and 69, so as to be held thereby firmly in position. A piston rod 71 is secured to piston 68 and operates through the head 69, a packing gland structure 72 being carried by the head for effecting a tight closure about the piston rod. In practice, the piston rod is connected, by means of a connecting rod (not shown) to the crank shaft of the engine.

The cylinder block 1$^A$ seats upon a rectangular air inlet casing 73 which is mounted upon the crank case 74 of the engine. The casing 73 is provided with an annular collar 75 which seats snugly about head 69. The casing is further provided with an upper air admission space 76 extending about the collar 75, the webs 77 connecting the collar to the casing being provided with suitable openings 78 (Fig. 11) to permit the air to flow freely about collar 75 within the casing 73. Air is supplied to the casing 73 from the air inlet header 60 by means of suitable conduits 79 communicating therewith and with air inlet openings 80 in the casing 73. The head 69 is provided with a central web 81 and with segmental air inlet openings 82 and 82$^A$ corresponding to the openings 10′ and 10$^A$ of head 9. These openings extend through the innermost wall 69$^A$ only of head 69. The head 69 is also provided with two arcuate guide members 69$^B$ which are disposed concentric with the gland structure 72 and extend completely through the head from the inner face to the outer face thereof.

A second valve 14 similar in construction to the valve mounted adjacent the inner face of head 9, is mounted adjacent the inner face of head 69, the arms of this valve extending through the guide members 69$^B$ and being connected by means of Pitman rods 27$^A$ to the ends of a rocker arm or beam 38$^A$ rockably mounted on a stud 39$^A$ secured in a bracket 40$^A$ secured to the air inlet housing or casing 73. The rocker arm or beam 38$^A$ is connected, to one side of its pivot, by means of a link 43$^A$ to one arm of a bell crank 41′ which is rockably mounted on a supporting rod 42$^A$ mounted in bracket 42$^B$ secured to the housing or casing 73. The other arm of the bell crank 41 is connected by a push rod 48$^C$ to a cam pin 52$^A$ carried by sleeve 50$^A$ at the upper end of the rod 48$^C$. Pin 52$^A$ travels in cam 54 and sleeve 50$^A$ is pivotally connected to the outer end of a rocker arm 57$^A$ rockably mounted at 59$^A$ on the cylinder block. The effective length of push rod 48$^C$ can be adjusted by means of a sleeve 49$^A$ into which the ends of the sections of this rod thread; or in any other suitable or preferred manner. As will be understood, the operation of the valve at the lower end of the cylinder is identical with the operation of the valve adjacent cylinder head 9, but is of opposite phase thereto. Collar 75 is provided with openings 82 which register with the outer end of duct 83 communicating with the respective openings 82 and 82$^A$ through the inner end wall or plate 69$^A$ of head 69. This permits free flow of scavenging air from the space about the collar 75 to the air inlet openings of the head and thence into the cylinder at the opposite end thereof from head 9.

Two fuel spray nozzles 84 are mounted through head 69 and fuel oil is supplied to these nozzles under pressure, in a known manner, through the tubes 85. These nozzles are secured in position in any suitable or preferred manner and are preferably positioned at opposite sides of the piston rod 71 so as to obtain uniform distribution of the fuel in the cylinder. The lower end of the air inlet chamber or casing 73 is closed by a suitable plate 86 secured to the casing or housing 73 in any suitable manner as by means of cap screws. This plate is provided with suitable openings to accommodate the tubes 85 and may also be provided with a central wiping gland structure 87 snugly enclosing the piston rod 71.

The operation of my valve in the double acting engine is identical with the operation previously described in connection with the single acting engine illustrated in Figures 1 to 9, inclusive; the only difference being in the operation of the engine itself. As will be readily understood by those familiar with this art, in the double acting engine every stroke is a combined combustion and compression stroke. As the piston is forced toward one end of the cylinder by the combined combustion and expansion taking place between the piston and the other end of the cylinder, it compresses the air in the cylinder between the piston and the first end of the cylinder. As the piston reaches its extreme travel the exhaust ports 5 are uncovered and the cylinder is scavenged out at what may be considered the combustion side of the piston. Immediately after this the fuel is injected into the piston at what may be at this time considered as the compression side thereof and combustion and compression takes place forcing the piston toward the other end of the cylinder. This operation is repeated as long as the engine is in operation. The valves at the end of the cylinder act to quickly admit the air for scavenging the cylinder at the opposite sides of the piston and for providing a supply of fresh air to support combustion of the fuel. Both of these valves may be adjusted in the manner previously described for supercharging the cylinder, which is an important feature of my invention.

As will be understood, suitable gaskets and other packing members will be supplied where necessary or desirable, and considerable variation may be made in the construction and arrangements of parts of the invention without departing from the field and scope of the same, and I intend to include all such variations, as fall within the scope of the appended claims, in this application in which the preferred forms only of my invention are disclosed.

What I claim is:—

1. In combination with an internal combustion engine, including a cylinder and a piston operating therein, means for admitting air to the combustion space of the cylinder in the direction of the axis thereof and with a straight line of flow from its point of admission through the cylinder.

2. In combination with an internal combustion engine including a cylinder and a piston operating therein, means for admitting fuelless air to the combustion space of the cylinder in the direction of the axis thereof, the volume of the admitted air increasing from the centre toward the periphery of the cylinder.

3. In combination with an internal combustion engine including a cylinder and a piston operating therein, the cylinder having outlet ports rendered active as the piston approaches the end of its out stroke, means for admitting air to the combustion space of the cylinder in the direction of the axis thereof and at predetermined periods of the travel of the piston, the admitted air having straight line flow from its point of admission through the cylinder.

4. In combination with a two cycle Diesel type engine having outlet ports in its cylinder disposed to be uncovered by the piston as it reaches the limit of its outstroke, means for admitting air to the combustion space of the cylinder at the outer end thereof and in the direction of the axis of the cylinder when the ports are uncovered, the air having straight line flow from its point of admission through the cylinder.

5. In combination with an internal combustion engine including a cylinder and a piston operating in the cylinder, a cylinder head having air inlet ports disposed to admit air to the cylinder axially thereof, said ports being arranged radially of the head to admit the air in a plurality of streams throughout the cross-area of the cylinder circumferentially thereof, and valve means for opening and closing said ports.

6. In combination with an internal combustion engine including a cylinder and a piston operating in the cylinder, a cylinder head having a series of air inlet ports extending therethrough from its outer face to its inner face and disposed radially of the head, the ports increasing in cross-area toward the periphery of the head, and valve means for opening and closing said ports.

7. In combination with an internal combustion engine including a cylinder and a piston operating in the cylinder, a cylinder head having a series of air inlet ports of segmental shape extending therethrough from its outer face to its inner face and disposed radially of the head, the broader portion of the openings being toward the periphery of the head, and valve means for opening and closing said ports.

8. In combination with an internal combustion engine including a cylinder and a piston operating in the cylinder, a cylinder head having a series of air inlet ports extending therethrough from its outer face to its inner face and disposed radially of the head, the ports increasing in cross-area toward the periphery of the head, said cylinder having outlet ports disposed to be uncovered by the piston as it reaches the limit of its combustion stroke, and timed valve means for opening and closing the ports.

9. In combination with an internal combustion engine including a cylinder and a piston operating in the cylinder, a cylinder head having a series of air inlet ports extending therethrough from its outer face to its inner face and disposed radially of the head, the ports increasing in cross-area toward the periphery of the head, said cylinder having outlet ports disposed to be uncovered by the piston as it reaches the limit of its combustion stroke, and timed valve means for opening and closing the ports, said means being adjustable to vary closing and opening of the ports relative to the operation of the piston.

10. In combination with an internal combustion engine including a cylinder and a piston operating in the cylinder, a cylinder head having a series of segmental air inlet ports extending therethrough from its outer face to its inner face and disposed radially of the head with their broader portions toward the periphery of said head, said cylinder having outlet ports disposed to be uncovered by the piston as it approaches the limit of its combustion stroke, and timed valve means for opening and closing the ports.

11. In combination with an internal combustion engine including a cylinder and a piston operating in the cylinder, the cylinder having outlet ports disposed to be uncovered by the piston as it approaches the limit of its combustion stroke, timed means for admitting air to the combustion space of the cylinder at the outer end and axially thereof, the volume of air admitted increasing from the central portion of the cylinder toward the periphery thereof.

12. In combination with an internal combustion engine including a cylinder and a piston operating in the cylinder, the cylinder having outlet ports disposed to be uncovered by the piston as it approaches the limit of its combustion stroke, timed means for admitting air to the combustion space of the cylinder at the outer end and axially thereof, the volume of air admitted increasing uniformly from the central portion of the cylinder toward the periphery thereof.

13. In combination with an internal combustion engine including a cylinder and a piston operating therein, a head for the cylinder provided with a series of air inlet ports extending through the head axially thereof, an oscillatory valve seating on the head coaxially therewith and having openings disposed to be moved into and out of register with the ports for opening and closing the same, and valve operating means driven in synchronism with the operation of the piston.

14. In combination with an internal combustion engine including a cylinder and a piston operating therein, means for admitting air to the cylinder throughout the greater portion of its cross-area, said means causing the volume of the admitted air to be increased from the central portion toward the periphery of the cylinder.

15. In combination with an internal combustion engine including a cylinder and a piston operating therein, a head for the cylinder provided with a series of air inlet ports extending through the head axially thereof, an oscillatory valve seating on the head and having openings disposed to be moved into and out of register with the ports for opening and closing the same, and valve operating means driven in synchronism with the operation of the engine.

16. In combination with an internal combustion engine including a cylinder and a piston operating therein, a head for the cylinder provided with a series of air inlet ports extending through the head axially thereof, an oscillatory valve seating on the inner face of the head and having openings disposed to be moved into and out of register with the ports for opening and closing the same, and valve operating means driven in synchronism with the operation of the engine.

17. In combination with an internal combustion engine including a cylinder and a piston operating therein, a head for the cylinder provided with a series of air inlet ports extending through the head axially thereof, an oscillatory valve seating on the inner face of the head and having openings disposed to be moved into and out of register with the ports for opening and closing the same, said valve being disposed coaxially with the cylinder, and valve operating means driven in synchronism with the operation of the engine.

18. In combination with an internal combustion engine including a cylinder and a piston operating therein, a head for the cylinder provided with a series of air inlet ports extending through the head axially thereof, said ports being of segmental shape with their broader ends toward the periphery of the head, an oscillatory valve mounted on the head and provided with openings disposed to be moved into and out of register with said ports, and valve operating means driven in synchronism with the engine.

19. In combination with an internal combustion engine including a cylinder and a piston operating therein, a head for the cylinder provided with a series of air inlet ports extending through the head axially thereof, said ports being of segmental shape with their broader ends toward the periphery of the head, an oscillatory valve mounted on the head and provided with openings disposed to be moved into and out of register with said ports, and valve operating means driven in synchronism with the engine.

20. In combination with an internal combustion engine including a cylinder and a piston operating therein, a head for the cylinder provided with a series of air inlet ports extending through the head axially thereof, said ports being of segmental shape with their broader ends toward the periphery of the head, an oscillatory valve mounted on the head and provided with openings disposed to be moved into and out of register with said ports, and valve operating means driven in synchronism with the engine.

21. In combination with an internal combustion engine including a cylinder and a piston operating therein, a head for the cylinder provided with a series of air inlet ports extending through the head axially thereof, said ports being of segmental shape with their broader ends toward the periphery of the head, an oscillatory valve seating on the inner face of the head and provided with openings disposed to be moved into and out of register with said ports, and valve operating means driven in synchronism with the engine.

22. In combination with an internal combustion engine including a cylinder and a piston operating therein, a head for the cylinder provided with a series of air inlet ports extending through the head axially thereof, said ports being of segmental shape with their broader ends toward the periphery of the head, an oscillatory valve mounted on the head and provided with openings disposed to be moved into and out of register with said ports, and valve operating means driven in synchronism with the engine, the valve including port covering elements between the openings flexibly connected to the body of the valve for individual movement to seat tightly about the respective ports of the head when the valve is closed, and timed means for operating said valve.

23. In combination in an internal combustion engine including a cylinder having a liner and a piston operating therein, a head secured to the cylinder and provided with ports extending through the head axially thereof, a disc valve seating on the inner face of the head and confined between the head and the cylinder liner, said valve having openings disposed to be moved into and out of register with the parts for closing and opening the same, and timed means for oscillating the valve.

24. In an internal combustion engine having exhaust ports in its cylinder uncovered by the piston as it approaches the end of its out stroke, timed means for admitting air to the outer end of the cylinder axially thereof, the air having unobstructed flow through the cylinder from its point of admission.

25. In an internal combustion engine having exhaust ports in its cylinder disposed to be uncovered by the piston as it approaches the end of its out stroke, timed means for admitting air to the outer end of the cylinder axially thereof and throughout substantially the entire cross area thereof, the admission of the air being unobstructed and the air having straight line flow through the cylinder.

26. In an internal combustion engine having exhaust ports in its cylinder disposed to be uncovered by the piston as it approaches the end of its out stroke, timed means for admitting air to the outer end of the cylinder axially thereof, the volume of air admitted increasing toward the periphery of the cylinder and the air having unobstructed straight line flow through the cylinder.

27. In an internal combustion engine having exhaust ports in its cylinder disposed to be uncovered by the piston as it approaches the end of its out stroke, timed means for admitting air to the outer end of the cylinder axially thereof, said means distributing the admitted air uniformly throughout the cross area of the cylinder, the the air having unobstructed flow from its point of admission through the cylinder.

In witness whereof, I hereunto subscribe my name this 26th day of October, 1926.

ERNEST NIBBS.